(12) United States Patent
Thekkumpat et al.

(10) Patent No.: US 12,469,073 B2
(45) Date of Patent: Nov. 11, 2025

(54) ANOMALY DETECTION AND CLUSTERING IN FINANCIAL DATA CHANNEL MIGRATION

(71) Applicant: Intuit Inc., Mountain View, CA (US)

(72) Inventors: Avinash Thekkumpat, Sunnyvale, CA (US); Arunkumar Ratheendran, Sunnyvale, CA (US); Alexander Blake Nigh, Neenah, WI (US); Sivachithambaram Rangaraj, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 1229 days.

(21) Appl. No.: 16/526,060

(22) Filed: Jul. 30, 2019

(65) Prior Publication Data

US 2021/0034917 A1     Feb. 4, 2021

(51) Int. Cl.
| | |
|---|---|
| *G06Q 40/02* | (2023.01) |
| *G06F 18/214* | (2023.01) |
| *G06F 18/23213* | (2023.01) |
| *G06N 20/00* | (2019.01) |
| *G06Q 30/02* | (2023.01) |

(52) U.S. Cl.
CPC ......... *G06Q 40/02* (2013.01); *G06F 18/2148* (2023.01); *G06F 18/23213* (2023.01); *G06N 20/00* (2019.01)

(58) Field of Classification Search
CPC ..................................................... G06Q 30/02

USPC ...................................................... 705/14.02
See application file for complete search history.

(56) References Cited

U.S. PATENT DOCUMENTS

| | | | |
|---|---|---|---|
| 2007/0011188 A1* | 1/2007 | Chitgupakar | G06F 16/2465 707/999.102 |
| 2008/0103996 A1* | 5/2008 | Forman | G06N 20/00 706/12 |
| 2010/0070556 A1 | 3/2010 | Heusermann et al. | |
| 2013/0198093 A1* | 8/2013 | Taylor, III | G06F 16/9535 705/311 |
| 2014/0013194 A1 | 1/2014 | Zongker | |
| 2016/0063325 A1 | 3/2016 | Kumar et al. | |
| 2018/0068281 A1* | 3/2018 | Johnston | G06Q 40/02 |
| 2019/0180255 A1* | 6/2019 | Deshpande | G06Q 30/0631 |

OTHER PUBLICATIONS

International Search Report and Written Opinion, dated Apr. 29, 2020, PCT/US2019/044415, filed Jul. 31, 2019.

* cited by examiner

*Primary Examiner* — Afaf Osman Bilal Ahmed
(74) *Attorney, Agent, or Firm* — Paradice & Li LLP (57) ABSTRACT

A method and system determines whether or not a new data acquisition process is working for individual financial accounts of users of a data management system. The method and system trains an analysis model with a machine learning process. The trained analysis model then analyzes financial data obtained by both an old data acquisition process and the new data acquisition process. The trained analysis model identifies whether the new data acquisition process is working properly based on the analysis.

8 Claims, 6 Drawing Sheets

PRODUCTION ENVIRONMENT 100

ANOMALY DETECTION AND CLUSTERING IN FINANCIAL DATA CHANNEL MIGRATION

BACKGROUND

Every year millions of people around the world use electronic data management systems to help manage their personal and business data. For example, many people utilize data management systems such as bookkeeping systems, tax return preparation systems, and personal financial tracking systems to help manage their personal and business finances. To best serve their users, data management systems often need to gather data representing transactions conducted by the users. Some data management systems try to obtain this transaction data from multiple user accounts that are often provided to the user by different financial institutions and credit card providers. These data management systems are often referred to as account, or data, aggregating systems. Users of these systems are provided the capability to monitor their transactions and other activities on their accounts from a single contact point, i.e. the data management system. Consequently, account aggregating data management systems can help users save time by eliminating the need for users to access, login, and review each of their accounts separately.

In order to aggregate the accounts of a user, the data management systems need to access and download the user's transactional data from the accounts. Consequently, the capability for these data management systems to automatically download transaction data from various financial institutions is an important feature. Downloaded transaction data, especially if its relatively complete data, can help users reconcile their income and expenses and create business reports in bookkeeping systems, help locate donations and other deductions in tax return preparation systems, and help users monitor their spending and budgets in personal data tracking systems.

In some cases, it is desirable to change a process by which transaction data is obtained from financial institutions. As an example, a new data acquisition process for acquiring financial transaction data may provide improved security or other improvements. Once the new process is implemented, it may be necessary to migrate users of the data management system from the previous data acquisition process to the new process. While the new data acquisition process typically represents an overall improvement, isolated problems that affect a relatively few number of users may occur. These problems can include incomplete data acquisition, erroneous data acquisition, or even a complete failure to acquire a user's data from their associated financial institutions.

This is a serious issue because without relatively complete transaction data, the data management system is not only unable to provide complete transaction and financial status data for the user, but any advice or reports provided to the user may be simply wrong because the input data was incomplete. Given that, as noted above, users of the data management systems may rely on the advice and reports provided by the data management system to make import decisions, including financial decisions, this is a serious problem for all parties.

To address this issue, some traditional data management systems use experts to manually investigate individual user data streams to determine if the new process is performing correctly. This results in enormous expenditure of human resource to investigate a large number of data streams. Furthermore, it may be infeasible to check each user's data stream due to the large number of users and the limited number of available experts. Consequently, some traditional data management systems may only become aware of problems with the new data acquisition processes when users complain about them or approach customer support. This often means the problem only becomes known after some damage has been done. The result is that some users may become frustrated when their data management services suddenly suffer a drop-in quality, or simply fail, upon migration to a new data acquisition process. This is particularly frustrating to the users because the users typically did not request, or even approve, the implementation of the new process. The user frustration can be further compounded by having to deal with customer support or technical support systems.

To address this long-standing issue, some data management systems have sought to automate the process of testing the migration for individual users to new data acquisition processes. However, this has proven extremely difficult because the data obtained from different processes typically have different structures and characteristics due the differences in the processes, even when both processes are operating correctly.

What is needed is a method and system that solves the long-standing technical problem of efficiently and effectively detecting problems in new data acquisition methods for individual users of a data management system.

SUMMARY

Embodiments of the present disclosure use a machine learning trained analysis model to test whether the data of users of a data management system is being obtained correctly by a new data acquisition process. During a trial phase, each user's data is obtained by both an old data acquisition process and by the new data acquisition process. If the new process is not working properly for a user, then the data management system continues to use the old process for that user until the problem is addressed.

According to the disclosed embodiments, the data management system tests the new data acquisition process for each user. The data management system attempts to obtain the same financial data for a user via both the previous and the new data acquisition processes. This data is passed to the trained analysis model. The trained analysis model compares the differences between the data obtained from the two processes. The trained analysis model outputs an indication of whether the new process is working correctly based on the comparison. If the new process is not working correctly, the data management system continues using the old process for that user until the problem can be addressed.

The analysis model is trained with a supervised machine learning process. Training set data is generated for the training process. The training set data includes, for each of a plurality of users, data obtained with both data acquisition processes. The training set data is labeled to indicate which data sets represent proper function of the new data acquisition process and which data sets represent incorrect function of the new data acquisition process. The training process trains the analysis model to accurately reproduce the labels.

Embodiments of the present disclosure provide the added benefit of clustering users for whom the new data acquisition process is not yet working properly. To this end, the data sets for each of the users for whom the new process is not yet working properly is passed to a clustering model. The clustering model groups the users based on their data sets.

After the groups have been made, the data management system can troubleshoot the new process for each group by selecting a few users from each group. A solution that works for the sampled users is likely to work for the other users in that group. The result is that effective solutions can be found for all of the users by finding solutions for each group.

As a result of these and other features discussed in more detail below, the disclosed embodiments represent an efficient, effective, and highly flexible technical solution to the long-standing technical problem of efficiently and effectively detecting problems in new data acquisition processes for individual users of a data management system.

Common reference numerals are used throughout the FIGS. and the detailed description to indicate like elements. One skilled in the art will readily recognize that the above FIGS. are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIGS., which depict one or more exemplary embodiments. Embodiments may be implemented in many different forms and should not be construed as limited to the embodiments set forth herein, shown in the FIGS., and described below. Rather, these exemplary embodiments are provided to allow a complete disclosure that conveys the principles of the invention, as set forth in the claims, to those of skill in the art.

Embodiments of the present disclosure enable a data management system to analyze, for each one of a group of multiple users, whether a new process for gathering, or acquiring, the user's data from a financial institution, such as a bank, is working properly for that user. To this end, a machine learning based analysis model is trained to determine whether data obtained by the process is working correctly for each user. The data management system obtains a data set for each user with both the new data acquisition process and an old data acquisition process. The trained analysis model compares, for each user, the data from both data acquisition processes and determines whether the new process is working correctly based on the comparison.

Embodiments of the present disclosure also provide a second analysis model, such as a clustering model, to assist in troubleshooting the new data acquisition process for those users for whom the new process is not yet working correctly. The test data for those users is passed to the clustering model. The clustering model groups those users based on the test data. Diagnostic systems can then find solutions for each group.

Figure 1:
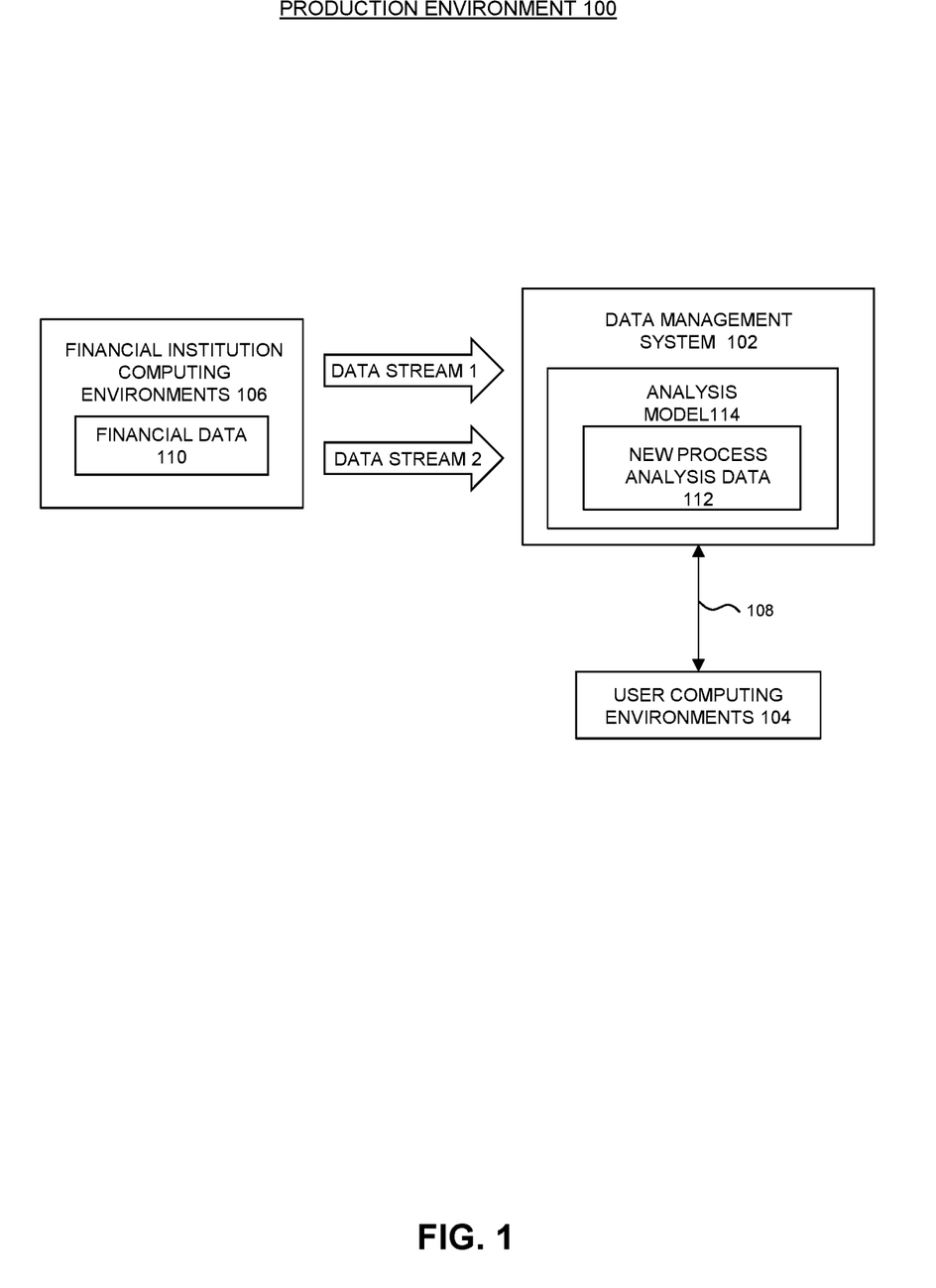
FIG. 1 is a block diagram of a production environment including a data management system, in accordance with one embodiment.

FIG. 1 illustrates a block diagram of a production environment 100 for determining if a new data acquisition process is working correctly for users of a data management system, according to one embodiment. The production environment 100 includes a data management system 102, user computing environments 104, and financial institution computing environments 106.

The data management system 102 can include one or more of a tax return preparation system, a bookkeeping system, a personal budgeting system, a financial transaction tracking system, or any other application as discussed herein, known in the art, or as later developed. As discussed above, the data management system 102 helps users to manage their financial information.

A user can login to the data management system 102 in order to receive data management services. The data management system 102 enables a user to view the user's data including personal and business financial data. The financial data can include data related to one or more financial accounts that the user has with one or more third-party financial institutions. The financial data can include financial account information identifying the financial accounts that the user has, as well as their balances. The financial data can also include data related to financial transactions associated with the various accounts of the users.

The user computing environments 104 enable users to interface with the data management system 102. Users can utilize the user computing environments 104 to connect with the data management system 102 to provide data to the data management system 102, and to receive data management services from the data management system 102. The data management system 102 and the user computing environments 104 are communicatively coupled together by one or more networks 108. The one or more networks 108 can also communicatively couple the financial institution computing environments 106 to the data management system 102 and the user computing environments 104.

The financial institution computing environments 106 correspond to computing environments associated with financial institutions. The financial institutions are institutions with which the users have financial accounts. The financial institutions can include banks, credit card companies, credit unions, lenders, investment managers, retirement account managers, or types of institutions with which the users can have financial accounts.

The financial institution computing environments 106 include financial data 110. The financial data 110 includes data related to the finances of the users that have accounts with the corresponding financial institutions. The financial data can include, for a given user, account data related to accounts of the user and transaction data related to the transactions associated with the user.

The account data can include data indicating the types of accounts that a user has with the financial institution. For example, if the financial institution is a bank, then the account data can include names of accounts, such as savings accounts and checking accounts. The account data can also include account numbers and account balances.

The transaction data can include data regarding financial transactions of the users. In an example in which the financial institution is a credit card company and the account of a user is a credit card account, then the transaction data can include data regarding credit card transactions of the user. The data related to a single transaction can include a transaction date, a transaction amount, a transaction type, an account type, a posted date, a transaction description, and an account number.

The data management system 102 assists users to manage their finances by obtaining, for each user, financial data from the financial institution computing environments 106. The data management system 102 retrieves, for each user, financial data including account data and transaction data related to the various accounts and transactions of the user. The users can login to the data management system 102 and can view all the data related to their various financial accounts and transactions from a single location. In this way, users do not need to log into a large number of financial accounts to view each account individually. Instead, the data management system 102 provides a convenient and helpful consolidated list of all financial data.

In order for the data management system 102 to obtain the financial data 110 of the users, the users need to enable the data management system 102 to access their financial accounts. When the data management system 102 has access to the financial accounts of the users with the financial institution computing environments 106, then the data management system 102 can utilize one or more processes to acquire the user data.

In one example, the data management system 102 uses a first data acquisition process to obtain financial data of the users. The first data acquisition process includes directly logging into the financial accounts of the users to obtain the financial data. Once the data management system 102 has logged into the account of a user, the data management system 102 utilizes a screen scraping process to acquire the account data and the transaction data of the users.

The screen scraping process can include executing a plurality of data aggregation scripts that enable the data management system 102 to collect financial data 110 from the financial accounts of a user. The script data includes the detailed instructions which, when executed, enable a data acquisition module of the data management system 102 to access the financial data 110 on the websites of various financial institutions with which the user has financial accounts. The scripts can enable the data acquisition module to navigate HTML data on the websites of the financial institutions in order to obtain the financial data 110 from the financial accounts of the user.

A user can have more than one financial account with a single financial institution. Typically, a user will have financial accounts with many financial institutions. In one embodiment, the script data includes a plurality of scripts each tailored to a specific financial institution, and possibly to a specific financial account within a specific financial institution. The scripts can include instructions for scraping financial data 110 from the websites of the financial institutions. The scripts can enable the data acquisition module to navigate HTML data on the websites of the financial institutions in order to obtain the financial data 110 from the financial accounts of the user.

The screen scraping process is often highly effective. The screen scraping process enables the data management system 102 to obtain accurate and up-to-date financial data for many or all of the users of the data management system 102. Data stream 1, shown in FIG. 1, illustrates the stream of financial data obtained by the data management system 102 via the first data acquisition process. As set forth above, the first data acquisition process is, in one example, the screen scraping process.

The screen scraping process typically requires that the users provide the data management system 102 with the login credentials of the users for the various financial institutions and accounts. This may mean that the users provide one or more of usernames, passwords, answers to security questions, phone numbers, birthdates, previous addresses, or other data that financial institutions may require to enable a user to login to the financial institutions. The data management system 102 then uses the login credentials to access the financial data 110 of the users.

The data management system 102 may wish to implement a second data acquisition process for acquiring the financial data 110 of the users from the financial institution computing environments 106. Despite the first data acquisition process being highly effective, other data acquisition processes may have some advantages over the first data acquisition process. Thus, for various reasons, the data management system 102 may develop a second data acquisition process for acquiring the financial data 110 of the users.

In one example, the second data acquisition process is an application programming interface (API) based data acquisition process. The financial institution computing environments 106 may provide APIs by which the data management system 102 can access the financial data 110 of users. The data management system 102 accesses the financial institution computing environments 106 by connecting to an API that is separate from the login portals utilized by the users.

Instead of directly logging into the accounts of the users, the data management system 102 accesses the data management system API provided by the financial institution computing environments 106 for data management systems. The data management system 102 provides credentials indicating that the user has authorized the data management system to access the financial data of the user. The financial institution computing environments 106 then output the financial data of the user to the data management system 102. In this case, the data management system 102 does not navigate through accounts and transaction webpages using screen scraping processes to download financial data 110 of the users. Instead, the financial institution computing environments 106 simply output the financial data of the users.

As part of this process, each user typically must log into the financial accounts and provide data indicating that the user grants the data management system 102 access to the financial data 110. The financial institution computing environments 106 then provide the data management system 102 with a certificate, token, cookie, or other credentials that indicate that the data management system 102 is authorized to receive financial data 110 associated with the user. The data management system 102 can then access the dedicated portal provided by the financial institution computing environments 106 and receives the financial data 110 from the financial institution computing environments 106.

One benefit of the second data acquisition process is that the data management system 102 never receives the login credentials of the users for the financial institutions. This is significant because anytime an individual provides financial institution login credentials to a third party, there is some security risk. While the data management system 102 securely utilizes and protects these login credentials, there is nevertheless a possibility that communications between the user and the data management system 102 can be intercepted by a malicious third-party if users are careless in selecting communication channels. If the user never provides these credentials to the data management system 102, then this possible security risk is avoided.

Data stream 2, shown in FIG. 1, illustrates the stream of financial data obtained by the data management system 102 via the second data acquisition process. As set forth above, the second data acquisition process is, in one example, the API based process described above. While some specific examples of data acquisition processes have been described, other data acquisition processes can be utilized by the data management system 102 as the first and second data acquisition processes without departing from the scope of the present disclosure.

The data management system 102 may wish to migrate as many users as possible from the first data acquisition process to the second data acquisition process. However, in accordance with the disclosed embodiments, the data management system 102 does not fully migrate any individual user to the second data acquisition process until the second data acquisition process has been thoroughly tested for that user. Therefore, in accordance with the disclosed embodiments, the data management system 102 continues utilizing the first data acquisition process until the second data acquisition process has been verified to work correctly for a particular user. Thus, during a testing period, the data management system 102 utilizes both the first and second data acquisition processes for a user. This ensures that data management services are not interrupted to any of the users.

The data management system 102 utilizes an analysis model 114 to determine whether the second data acquisition process is functioning correctly for each user. The analysis model 114 analyzes, for each user, financial data obtained from the first and second data acquisition processes in order to determine if the second data acquisition process is functioning correctly. The analysis model 114 outputs, for each user, new process analysis data 112. The new process analysis data 112 indicates whether the second data acquisition process is functioning correctly for that user.

The analysis model 114 receives, for each user, a data set that includes data obtained via the first data acquisition process and data obtained via the second data acquisition process. The data management system 102 intends that data set to include the same financial data. To generate a data set, the data management system 102 obtains financial data associated with an account or set of transactions for a particular period of time via the first data acquisition process. The data management system 102 then obtains that same data via the second data acquisition process. This data set that includes data obtained by the first and second data acquisition processes is then used by the analysis model 114 to determine if the second data acquisition process is functioning properly.

The analysis model 114 compares, for a given data set, the data obtained via the second data acquisition process to the data obtained via the first data acquisition process. The analysis model 114 determines whether the second data acquisition process is working properly based on this comparison. The data obtained by the different data acquisition process may not have the same structure even if both processes are working properly. Accordingly, the comparison made by the analysis model 114 is more complex than merely determining if the data obtained from both processes is identical. Further details regarding this comparison are provided below in relation to FIGS. 2-5.

Because each user may have accounts with multiple financial institutions, the second data acquisition process is tested for each account with each financial institution for each user. The second data acquisition process may, for a single user, work properly for a first account of the user while not yet working properly for a second account of the user. Accordingly, the data management system 102 may individually test and approve the second data acquisition process for multiple financial institutions or multiple accounts for single user.

The analysis model 114 may include multiple analysis submodels. As set forth briefly above, the financial data 110 may include both account data and transaction data. The account data related to an account may have a first set of data fields. The transaction data related to a single transaction may have a second set of data fields that include a larger number of data fields and more complex data in some of the data fields. It is possible that a model that performs well for analyzing the account data will not perform as well for analyzing transaction data. Accordingly, the analysis model 114 may include a first submodel suited for analyzing the account data and a second model suited for analyzing transaction data, as will be described in more detail below.

Figure 2:
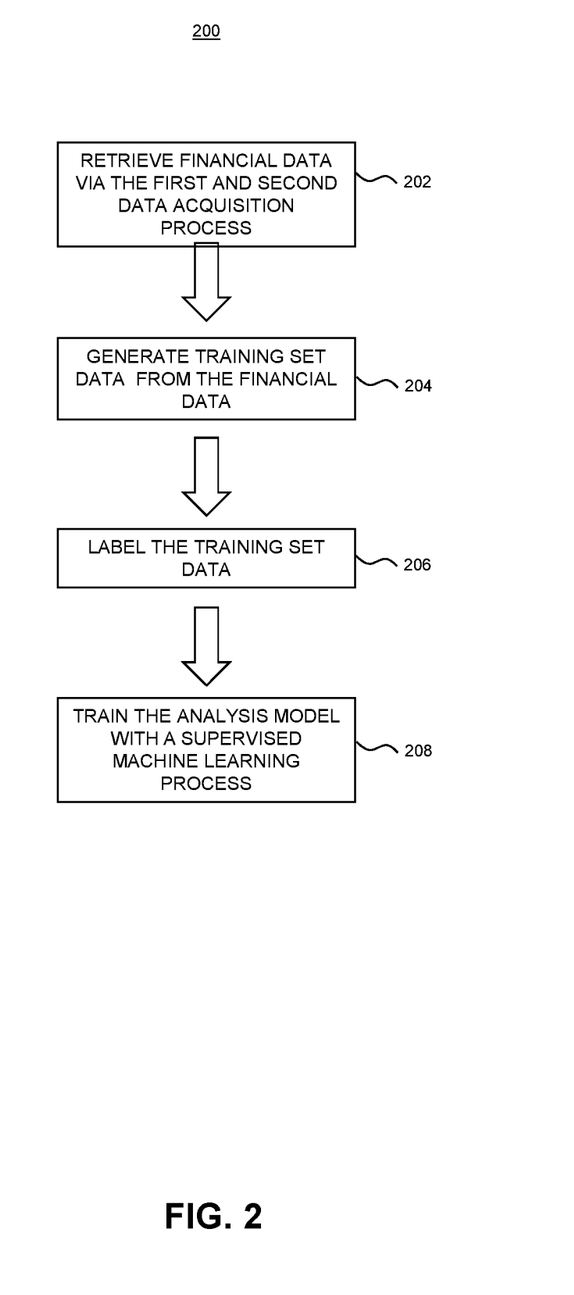
FIG. 2 is a flow diagram of a process for training an analysis model of a data management system, in accordance with one embodiment.

FIG. 2 is a flow diagram of a process 200 for training an analysis model to determine whether a new data acquisition process is functioning properly.

With reference to FIG. 2 and FIG. 1, at 202, the data management system 102 retrieves financial data via the first and second data acquisition processes. The data management system 102 obtains, for each of a plurality of users of the data management system 102, financial data. The data management system 102 attempts to obtain, for each user, the same data using both the first and second data acquisition processes.

At 204, training set data is generated from the financial data. The training set data is generated by formatting the financial data into data sets. The training set data includes, for each user, the corresponding data set. Each data set includes data obtained via the first data acquisition process and data obtained via the second data acquisition process.

Each data set can include a first feature vector and a second feature vector. The first feature vector corresponds to data obtained via the first data acquisition process. The second vector corresponds to data obtained via the second data acquisition process. The first and second vectors each include a plurality of data fields. The data fields correspond to the fields of the financial data. For example, if the financial data includes account data, then each data field of a feature vector corresponds to an expected field of the account data. The first feature vector includes the data from each field of the financial data, obtained via the first data acquisition process, populated in the data fields of the first feature vector. The second feature vector includes the data from each field of the financial data, obtained via the second data acquisition process populated in the data fields of the second feature vector.

In another example, each data set includes a plurality of first feature vectors and a plurality of second feature vectors. Each first feature vector can include data representing a particular field of the financial data obtained via the first data acquisition process. Each second feature vector can include data representing a particular field of the financial data obtained via the second data acquisition process. The data from each field of the financial data may initially be in the form of a string of alphanumeric characters. The feature vectors can be generated by performing a vectorization process on the strings representing the fields of the financial data.

In another example, each data set includes a plurality of first strings and a plurality of second strings. The first strings include the data strings representing the fields of the financial data obtained via the first data acquisition process. The second strings include the data strings representing the fields of the financial data obtained via the second data acquisition process. Those of skill in the art will recognize, in light of the present disclosure, that many other kinds of formats can be used for the data sets in the training set data without departing from the scope of the present disclosure.

Even when both the first and second data acquisition processes are functioning properly, the financial data obtained via these processes will not initially be identical. In an example in which the data acquisition processes include screen scraping and API based processes, these different processes will result in financial data initially having significantly different characteristics. Because screen scraping involves crawling through HTML data and exporting data from various webpages via screen scraping scripts, the data obtained in this manner may include many artifacts and structures that correspond to HTML data. Because the API based process involves receiving data from the financial institutions in whatever format is chosen by the financial institutions, this data may also include structures, artifacts, and other aspects that are different than data obtained via screen scraping.

Thus, even when the data obtained by these two processes is accurate and represents the same financial data, the data will not initially be identical. Additionally, before this data can be presented to the user, many data extraction and formatting processes are utilized to ensure that the data is placed in a user readable format. Accordingly, initially determining whether or not the new data acquisition process is functioning properly may not include a simple straightforward comparison of the data obtained from both the data acquisition processes.

At 206 the process 200 labels the training set data. The labels can be generated by one or more experts analyzing many sets of data and determining whether the data from the second data acquisition process represents the same underlying data from the first data acquisition process. Thus, for each data set in the training set data, a label is generated indicating whether or not the data set represents proper function of the second data acquisition process. While the process of manually labeling data sets is initially difficult and time-consuming for experts, this labeling process is, in the long run, extremely beneficial, as will be set forth in more detail below.

At 208, the analysis model 114 is trained with a supervised machine learning process. In particular, the labeled training set data is passed to the analysis model. The machine learning process trains the analysis model in iterations to match each data set to the correct label. The machine learning process ensures that the analysis model can receive a data set, compare the data from the first and second data acquisition processes, and determine whether the second data acquisition process is functioning correctly. In this way, the analysis model 114 is trained to accurately reproduce the labels.

The machine learning training process may include multiple machine learning training processes. The analysis model 114 may include multiple submodels each dedicated to analyzing a particular type of financial data. In this case, the machine learning process includes training each submodel. Different training set data may be generated for each submodel. A first submodel may be trained to analyze account data. A second submodel may be trained to analyze transaction data. A different training set will be generated for each of the submodels. Additionally, each submodel may include a different type of machine learning algorithm, as will be set forth in more detail below.

The machine learning process can include setting aside a percentage of labeled financial data as testing data for testing purposes. For example, after the analysis model has initially been trained, the testing data is then passed through the analysis model 114. The results of the analysis model are compared to the labels on the testing data. If the results indicate that the analysis model is not sufficiently accurate, then the analysis model can be retrained, or additional training can be performed. Testing can then occur again and the process can be repeated until the analysis model 114 is sufficiently accurate. In one example, 80% of the labeled data is used for training and 20% of the labeled data is used for testing.

Figure 3:
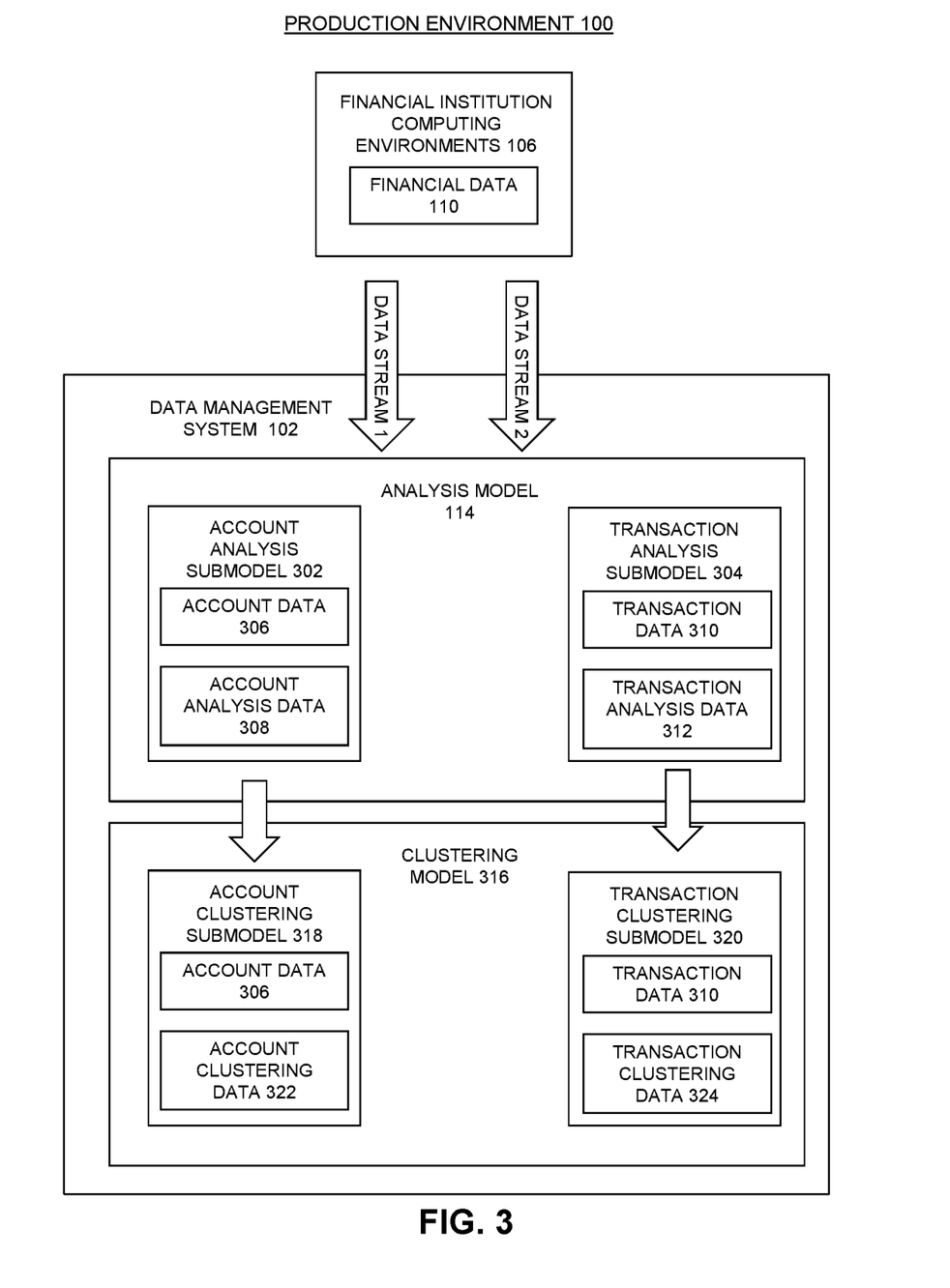
FIG. 3 is a block diagram of a production environment including a data management system, in accordance with one embodiment.

FIG. 3 is a more detailed block diagram of the production environment 100, according to an embodiment. The production environment 100 includes the data management system 102 and the financial institution computing environments 106. The data management system 102 retrieves financial data 110 from the financial institution computing environment 106 via a first data acquisition process and via a second data acquisition process. Data stream 1 represents the financial data 110 obtained via the first data acquisition process. Data stream 2 represents the financial data 110 obtained via the second data acquisition process.

The data management system 102 includes the analysis model 114. The analysis model 114 includes an account analysis submodel 302. The analysis model 114 also includes a transaction analysis submodel 304.

The account analysis submodel 302 is utilized by the analysis model 114 to analyze account data 306. The account data 306 corresponds to a portion of the financial data 110. As described previously, the financial data 110 can include account data that correspond to the general data related to a financial account of the user. The account data can include a masked account number, an account type, and an account balance. If the second data acquisition process is working correctly, then each of these fields or aspects of the account data will be correctly retrieved by the second data acquisition process.

The masked account number corresponds to the account number of the account of the user with the financial institution. The entirety or portions of the account number are masked when retrieved by the data management system 102. This ensures that the account number cannot be surreptitiously obtained by intercepting the data stream 1 or by illicitly accessing the data management system 102. In one example, the masked account number includes an account number in which all but four digits are obscured.

The account type lists the type of the account of the user with the financial institution. The account type can list whether the account is a credit card account, a personal checking account, a personal savings account, a joint checking account, a joint savings account, a business checking account, a business savings account, a retirement account, an investment account, a loan account, or other types of financial accounts.

The account balance lists the balance of the account. The account balance can correspond to a total amount of money in the account, a remaining loan balance, total assets in a retirement account, total assets in an investment account, or a credit card balance.

The account data 306 includes, for a single account of a user, the same account data obtained via both the first data acquisition process and the second data acquisition process. The raw account data obtained via the first and second data acquisition processes will be different from each other even if both processes are operating correctly. Accordingly, the account analysis submodel 302 is needed to determine if the second data acquisition process is operating correctly.

The account analysis submodel 302 analyzes the account data 306 and generates account analysis data 308. The account analysis data 308 indicates whether or not the second data acquisition process is functioning properly for that particular account. Because the account analysis submodel 302 has been trained with a machine learning process to reproduce the labels from the training set data, as described in relation to FIG. 2, the account analysis submodel 302 is able to accurately determine whether or not the second data acquisition process is functioning properly. The account analysis submodel 302 is able to make this determination without performing the resource intensive formatting and data exportation processes that would need to be performed to determine if the first and second data acquisition processes are providing identical data.

When the account analysis submodel 302 has analyzed a first account of the user, the account analysis submodel 302 can analyze a second account of the user. The account analysis submodel can generate account analysis data 308 for each account of the user. The account analysis submodel 302 continues in this manner until all accounts have been analyzed.

The data management system 102 can determine that a user will be migrated to the second data acquisition process if the account analysis data 308 indicates that the second data acquisition process is accurately functioning for that user. The data management system 102 can make this determination on an account by account basis. Alternatively, the data management system 102 can determine that the user will not be migrated until the second data acquisition process is functioning for all accounts of the user.

In one embodiment, the account analysis submodel 302 is a naïve Bayes model. The account analysis submodel 302 is trained with a naïve Bayes machine learning training process. Accordingly, the account analysis submodel 302 implements a naïve Bayes analysis algorithm.

The naïve Bayes model is a supervised machine learning classifier model. In the case of the account analysis submodel 302, the naïve Bayes model classifies each account as properly functioning or not. In particular, the classification indicates whether or not the second data acquisition process is functioning properly or not.

The inventors discovered that the naïve Bayes model worked particularly well for classifying account data 306. Accordingly, in one example, the account analysis submodel 302 is a naïve Bayes model. However, those of skill in the art will recognize, in light of the present disclosure, that other supervised machine learning models can be utilized for the account analysis submodel 302 without departing from the scope of the present disclosure.

In one example, the account analysis submodel 302 calculates a delta value for the account. The delta value corresponds to a difference in the account data gathered via the first data acquisition process versus the account data gathered via the second data acquisition process. Even when the second data acquisition process is functioning properly, it is expected that this delta value will be nonzero. The delta value can include an overall difference between the account data gathered by the two data acquisition processes. Alternatively, the delta value can include a vector indicating the differences in each of the fields associated with the account.

The transaction analysis submodel 304 is utilized by the analysis model 114 to analyze transaction data 310. The transaction data 310 corresponds to a portion of the financial data 110. As described previously, the financial data 110 can include transaction data that corresponds to the transaction data related to a financial account of the user. The transaction data includes transaction data for a plurality of financial transactions associated with an account. The data for each transaction can include a masked account number, a transaction type, a posted date, a transaction amount, an account type, a transaction date, and a transaction description. If the second data acquisition process is working correctly, then each of these fields or aspects of the transaction data will be correctly retrieved by the second data acquisition process.

The masked account number corresponds to the account number of the account with which the transaction is associated. For example, if the transaction is a credit card transaction for a particular credit card, then the masked account number corresponds to the credit card account number with the entirety or portions of the credit card account number obscured.

The transaction type indicates a type of the transaction. The transaction type can indicate whether or not the transaction was a purchase, a sale, a refund, or a transfer between accounts.

The posted date indicates the date on which the transaction was posted in the account. The date on which a transaction is posted in an account may be different than the date on which the transaction took place. Accordingly, the transaction data 310 includes the posted transaction date.

The transaction amount indicates the value of the transaction. The transaction amount can indicate an amount of money for a purchase, an amount of money for a sale, an amount of money for a refund, or an amount of money for a transfer.

The account type lists the type of the account associated with the transaction. The account type can list whether the account is a credit card account, a personal checking account, a personal savings account, a joint checking account, a joint savings account, a business checking account, a business savings account, a retirement account, an investment account, a loan account, or other types of financial accounts.

The transaction date indicates the date on which the transaction occurred. As described previously, the transaction date can be different than the date on which a transaction is posted.

The transaction description corresponds to a description string that describes aspects of the transaction. The transaction description can indicate the name of a counterparty, a type of business associated with the counterparty, a location at which the transaction took place, or other aspects of the transaction.

The transaction data 310 includes, for a single account of a user, the same transaction data obtained via both the first data acquisition process and the second data acquisition process. The raw transaction data obtained via the first and second data acquisition processes will be different from each other even if both processes are operating correctly. Accordingly, the transaction analysis submodel 304 is needed to determine if the second data acquisition process is operating correctly.

The transaction analysis submodel 304 analyzes the transaction data 310 and generates transaction analysis data 312. The transaction analysis data 312 indicates whether or not the second data acquisition process is functioning properly for the transactions of that particular account. Because the transaction analysis submodel 304 has been trained with a machine learning process to reproduce the labels from the training set data, as described in relation to FIG. 2, the transaction analysis submodel 304 is able to accurately determine whether or not the second data acquisition process is functioning properly with regards to the transactions for a particular account. The transaction analysis submodel 304 is able to make this determination without performing the resource intensive formatting and data exportation processes that would need to be performed to determine if the first and second data acquisition processes are providing identical data.

When the transaction analysis submodel 304 has analyzed the transactions associated with a first account of the user, the transaction analysis submodel 304 can analyze transactions associated with a second account of the user. The transaction analysis submodel can generate transaction analysis data 312 for the transactions of each account of the user. The transaction analysis submodel continues in this manner until the transactions for all accounts have been analyzed.

In one example, the transaction analysis submodel 304 calculates a delta value for each transaction. The delta value corresponds to the difference in the transaction data gathering via the first data acquisition process versus the transaction data gathered via the second data acquisition process. Even when the second data acquisition processes function properly, it is expected that this delta value will be nonzero. The delta value can include an overall difference between the transaction data gathered by the two data acquisition processes. Alternatively, the delta value can include a vector indicating the differences in each of the fields. The transaction analysis submodel 304 can determine whether or not the second data stream is functioning properly based on the delta values for each of the transactions associated with an account.

The data management system 102 can determine that a user will be migrated to the second data acquisition process if the transaction analysis data 312 indicates that the second data acquisition processes is accurately functioning for that user. The data management system 102 can make this determination on an account by account basis. Alternatively, the data management system 102 can determine that the user will not be migrated until the second data acquisition processes functioning for all accounts of the user.

In one embodiment, the transaction analysis submodel 304 is a logistic regression model. The transaction analysis submodel 304 is trained with a logistic regression machine learning training process. Accordingly, the transaction analysis submodel 304 implements a logistic regression analysis algorithm.

The logistic regression model is a supervised machine learning classifier model. In the case of the transaction analysis submodel 304, the logistic regression model classifies each account as properly functioning or not. In particular, the classification indicates whether or not the second data acquisition process is functioning properly or not for the transactions of a given account.

The inventors discovered that the logistic regression model worked particularly well for classifying transaction data 310. Accordingly, in one example, the transaction analysis submodel 304 is a logistic regression model. However, those of skill in the art will recognize, in light of the present disclosure, that other supervised machine learning models can be utilized for the transaction analysis submodel 304 without departing from the scope of the present disclosure.

In one example, the data management system 102 includes a clustering model 316. The clustering model 316 helps in the diagnostic process for determining why the second data acquisition process is not functioning properly for various accounts and transactions. The clustering model 316 includes an account clustering submodel 318 and a transaction clustering submodel 320.

The account clustering submodel 318 helps to cluster accounts for which the account analysis submodel 302 has indicated that the second data acquisition process is not functioning properly. When the account analysis data 308 indicates that the second data acquisition process is not functioning for a particular account, the account data 306 is passed to the account clustering submodel 318. The account clustering submodel 318 analyzes the account data 306 associated with the accounts. The account clustering submodel 318 generates account clustering data 322 indicating clusters of accounts.

Accounts for which the delta value or other aspects of the account data 306 are similar are likely to have a same solution in troubleshooting the second data acquisition process. Accordingly, by grouping accounts based on the account data 306, the data management system 102 can seek to find solutions based on the groups rather than for each individual account. A solution that works for one account in a group is likely to work for other accounts in the group. Accordingly, grouping the accounts can greatly reduce the amount of human and processing resources needed to find solutions for the second data acquisition process.

In one example, the account clustering submodel 318 is a K means clustering model. In the K means clustering model, the vectors representing the account data 306, or the delta values calculated based on the account data 306, are passed to the account clustering submodel 318. The K means clustering model clusters the accounts by embedding their respective vectors in a vector space. The vectors that are closest to each other in the vector space are grouped together. This is a process by which clustering is performed. Each account is assigned to a group or cluster based on the vector embeddings.

Those of skill in the art will recognize, in light of the present disclosure, that other clustering algorithms can be used aside by the account clustering submodel 318 from K means clustering without departing from the scope of the present disclosure. For example, the account clustering submodel 318 can utilize a K nearest neighbors clustering, a DBSCAN clustering algorithm, an affinity propagation clustering algorithm, or other types of clustering algorithms.

After the account clustering submodel 318 has generated the account clustering data 322 indicating the clusters or groups of accounts, the account clustering submodel 318 can provide the account clustering data 322 to a diagnostic system. The diagnostic system can then seek to repair or improve the second data acquisition process for the accounts by first trying to find general solutions for each group of accounts.

The transaction clustering submodel 320 helps to cluster accounts for which the transaction analysis submodel 304 has indicated that the second data acquisition process is not functioning properly. When the transaction analysis data 312 indicates that the second data acquisition process is not functioning for a particular account, the transaction data 310 is passed to the transaction clustering submodel 320. The transaction clustering submodel 320 analyzes the transaction data 310 associated with the accounts. The transaction clustering submodel 320 generates transaction clustering data 324 indicating clusters of accounts for which the second data acquisition process is not properly obtaining transaction data.

Accounts for which the delta value or other aspects of the transaction data 310 are similar are likely to have a same solution in troubleshooting the second data acquisition process. Accordingly, by grouping accounts based on the transaction data 310, the data management system 102 can seek to find solutions based on the groups rather than for each individual account. A solution that works for one account in a group is likely to work for other accounts in the group. Accordingly, grouping the accounts can greatly reduce the amount of human and processing resources needed to find solutions for the second data acquisition process.

In one example, the transaction clustering submodel 320 is a K means clustering model. In the K means clustering model, the vectors representing the transaction data 310, or the delta values calculated based on the transaction data 310, are passed to the transaction clustering submodel 320. The K means clustering model clusters the accounts by embedding their respective vectors in a vector space. The vectors that are closest to each other in the vector space are grouped together. This is a process by which clustering is performed. Each account is assigned to a group or cluster based on the vector embeddings.

Those of skill in the art will recognize, in light of the present disclosure, that other clustering algorithms can be used aside by the transaction clustering submodel 320 from K means clustering without departing from the scope of the present disclosure. For example, the transaction clustering submodel 320 can utilize a K nearest neighbors clustering, a DBSCAN clustering algorithm, an affinity propagation clustering algorithm, or other types of clustering algorithms.

After the transaction clustering submodel 320 has generated the transaction clustering data 324 indicating the clusters or groups of accounts, the transaction clustering submodel 320 can provide the transaction clustering data 324 to a diagnostic system. The diagnostic system can then seek to repair or improve the second data acquisition process for the accounts by first trying to find general solutions for each group of accounts.

Figure 4:
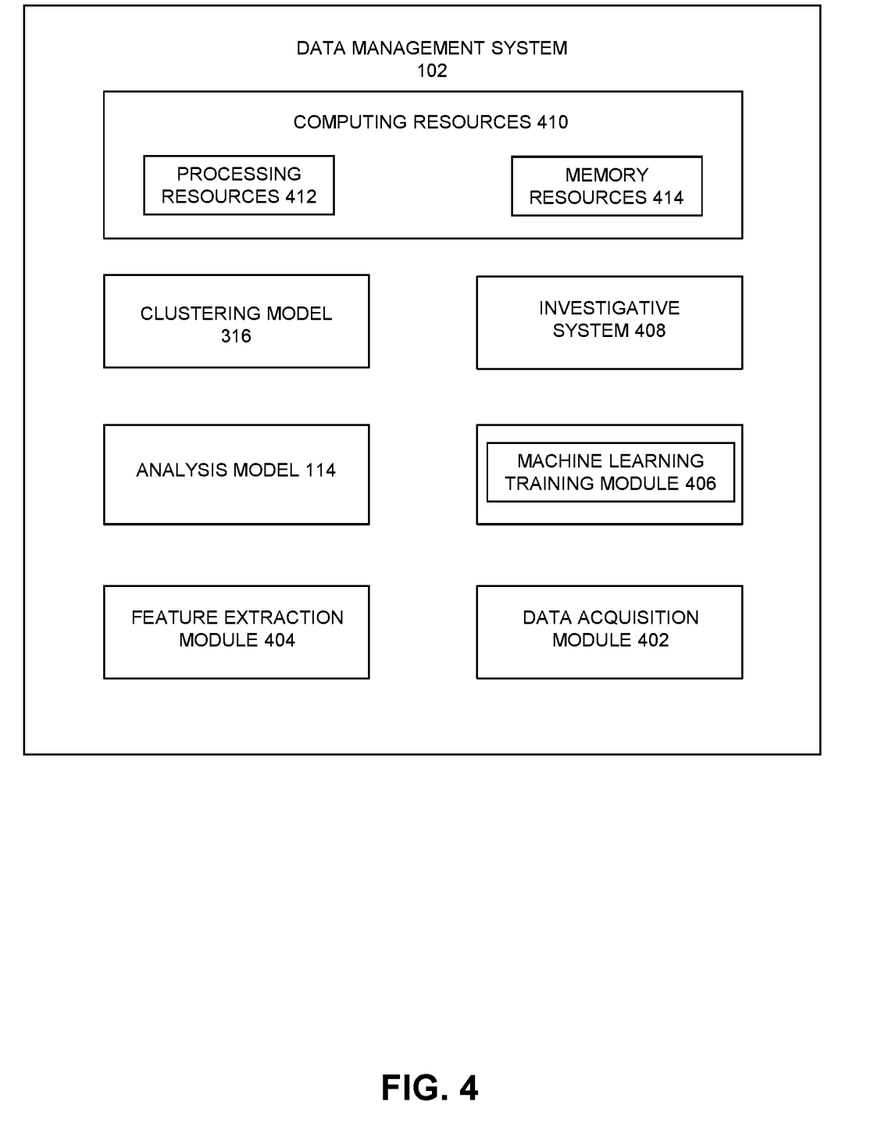
FIG. 4 is a block diagram of a data management system, in accordance with one embodiment.

FIG. 4 is a more detailed block diagram of a data management system 102. The data management system 102 includes a data acquisition module 402, a feature extraction module 404, a machine learning training module 406, an analysis model 114, a clustering model 316, an investigative system 408, and computing resources 410.

The data acquisition module 402 performs the first and second data acquisition processes. Accordingly, the data acquisition module 402 interfaces with the financial institution computing environments 106 in order to obtain financial data 110 of users of the data management system 102. The data acquisition module 402 can include a first submodule or system that performs the first data acquisition process. The data acquisition module 402 can include a second submodule or system that performs the second data acquisition process.

The feature extraction module 404 extracts account and transaction features from the financial data 110 retrieved by the data acquisition module 402. For example, the feature extraction module 404 can extract the account features described previously such as the masked account number, the account type, and the account balance. The feature extraction module 404 can also extract the transaction features described previously, such as the transaction type, the posted the dates of the transaction, the date of the transaction, the transaction description, the accounts type, and the masked account number. The feature extraction module 404 can extract these features and format them for either the machine learning process or for actual analysis of the user account and transaction data by the analysis model.

The machine learning training module 406 performs the machine learning process for the analysis model 114. The machine learning training module 406 utilizes labeled training set data to train the analysis model 114 with one or more machine learning processes, as described previously. The machine learning training module 406 can also train the account analysis submodel 302 and the transaction analysis submodel 304 with separate machine learning processes.

The analysis model 114 analyzes the financial data 110 including the account data 306 and the transaction data 310 in order to generate account analysis data 308 and transaction analysis data 312.

A clustering model 316 receives the account data 306 and the transaction data 310 in order to generate groups of accounts and groups of transactions. clustering model 316 generates the grouping data including the clusters. The grouping data can include account grouping data 322 and transaction clustering data 324. The clustering model 316 passes the grouping data to the investigative system 408.

The investigative system 408 samples one or more accounts from each group and analyzes the account data 306 and/or the transaction data 310 associated with the sampled accounts. The investigative system 408 troubleshoots the second data acquisition process in order to find a solution for each group by finding solutions for the sampled accounts from each group.

In one embodiment, the data management system 102 includes computing resources 410. The computing resources 410 include processing resources 412 and memory resources 414. The processing resources 412 include one or more processors. The memory resources 414 include one or more memories configured as computer readable media capable of storing software instructions and other data. The processing resources 412 are capable of executing software instructions stored on the computer readable media. In one embodiment, the various components, modules, databases, and engines of the data management system 102 utilize the computing resources 410 to assist in performing their various functions. Alternatively, or additionally, the various components, modules, databases, and engines can utilize other computing resources.

Figure 5:
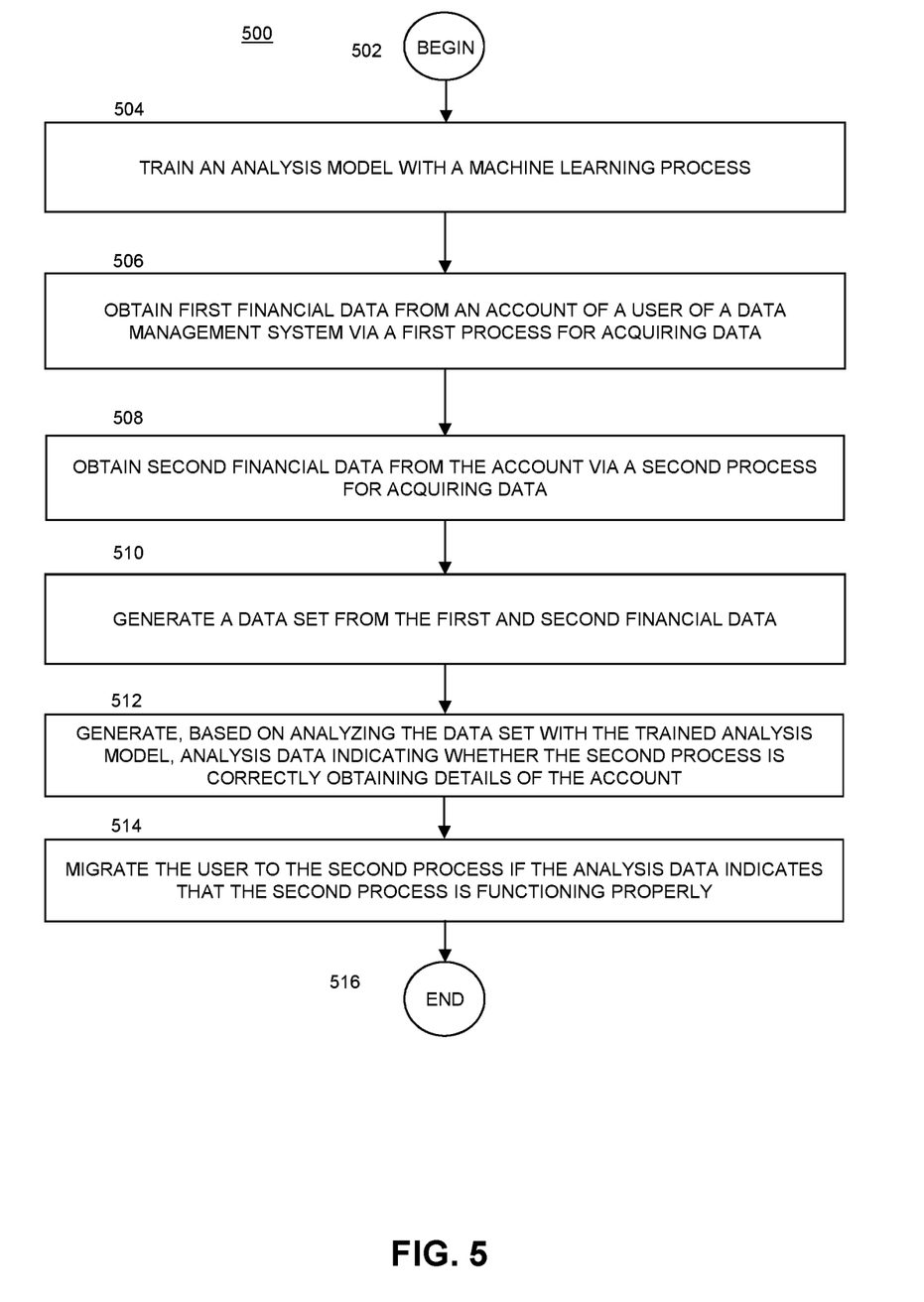
FIG. 5 is a flow diagram of a process for determining if a new data acquisition process is working correctly for users of a data management system, in accordance with one embodiment.

FIG. 5 is a flow diagram of a process 500 for determining if a new data acquisition process is working correctly for users of a data management system, in accordance with one embodiment. Referring to FIGS. 1-5, and the description of FIGS. 1-4 above, in one embodiment, process 500 begins at 502 and process flow proceeds to 504.

At 504, an analysis model is trained with a machine learning process, using any of the methods, processes, and procedures discussed above with respect to FIGS. 1-4.

At 506, first financial data is obtained from an account of a user of a data management system via a first process for acquiring data, using any of the methods, processes, and procedures discussed above with respect to FIGS. 1-4.

At 508, second financial data is obtained from the account via a second process for acquiring data, using any of the methods, processes, and procedures discussed above with respect to FIGS. 1-4.

At 510, a data set is generated from the first and second financial data, using any of the methods, processes, and procedures discussed above with respect to FIGS. 1-4.

At 512, analysis data is generated, with the trained analysis model, indicating whether the second process is correctly obtaining details of the account, using any of the methods, processes, and procedures discussed above with respect to FIGS. 1-4.

At 514 the user is migrated to the second data acquisition process if the analysis data indicates that the second data acquisition process is functioning properly, using any of the methods, processes, and procedures discussed above with respect to FIGS. 1-4.

At 516 the process 500 for determining if a new data acquisition process is working correctly for users of a data management system is exited to await new data and/or instructions.

Figure 6:
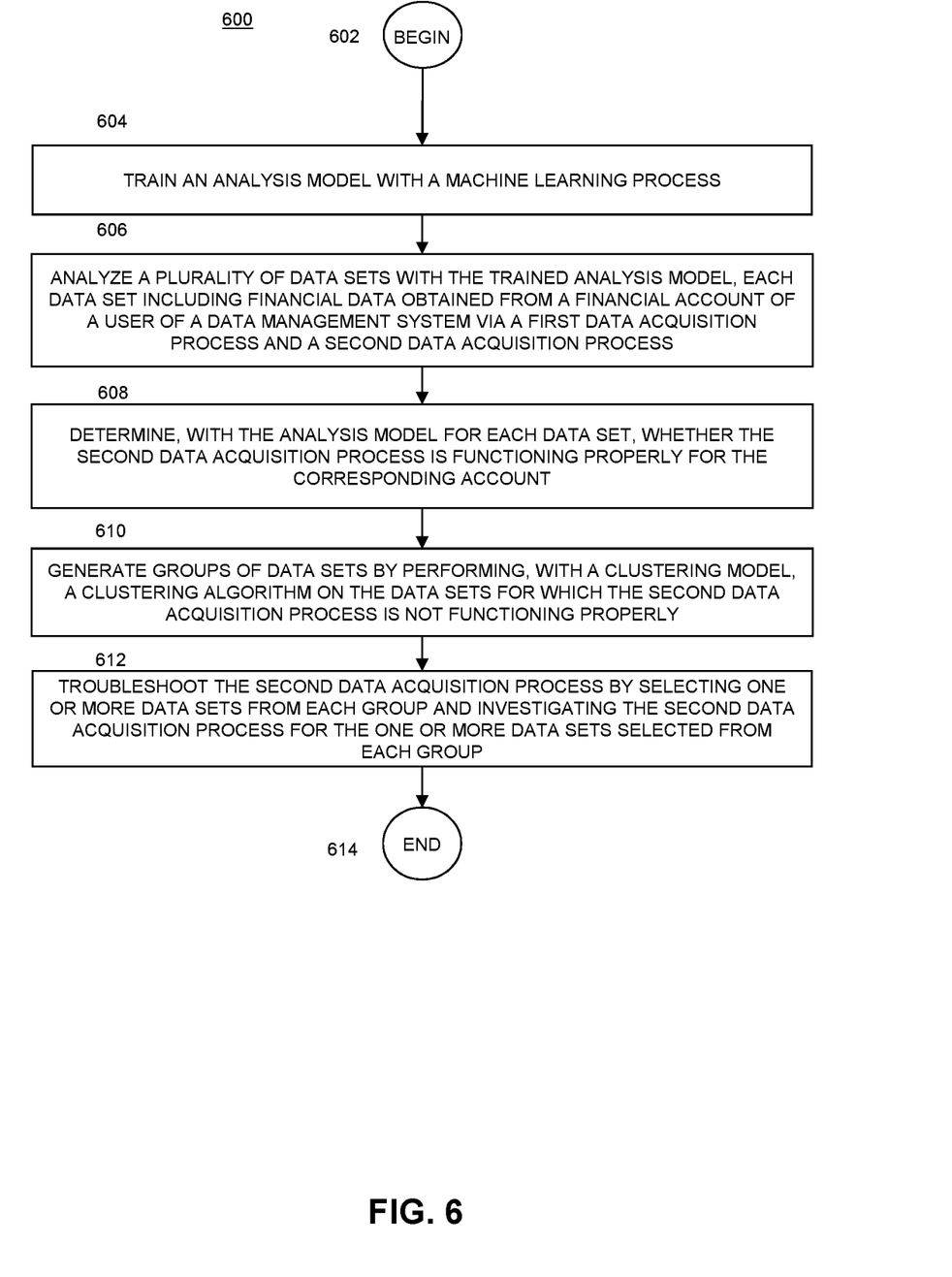
FIG. 6 is a flow diagram of a process for determining if a new data acquisition process is working correctly for users of a data management system, in accordance with one embodiment.

FIG. 6 illustrates a flow diagram of a process 600 for determining if a new data acquisition process is working correctly for users of a data management system, in various embodiments.

Referring to FIGS. 1-4, 6, and the description of FIGS. 1-4 above, process 600 begins at 602 and process flow proceeds to 604.

At 604, an analysis model is trained with a machine learning process, using any of the methods, processes, and procedures discussed above with respect to FIGS. 1-4.

At 606, a plurality of data sets is analyzed with the trained analysis model, each data set including financial data obtained from a financial account of a user of a data management system via a first data acquisition process and a second data acquisition process, using any of the methods, processes, and procedures discussed above with respect to FIGS. 1-4.

At 608, it is determined, with the analysis model for each data set, whether the second data acquisition process is functioning properly for the corresponding account, using any of the methods, processes, and procedures discussed above with respect to FIGS. 1-4.

At 610, groups of data sets are generated by performing, with a clustering model, a clustering algorithm on the data sets for which the second data acquisition process is not functioning properly, using any of the methods, processes, and procedures discussed above with respect to FIGS. 1-4.

At 612, the second data acquisition process is troubleshot by selecting one or more data sets from each group and investigating the second data acquisition process for the one or more data sets selected from each group, using any of the methods, processes, and procedures discussed above with respect to FIGS. 1-4.

At 614 the process 600 for determining if a new data acquisition process is working correctly for users of a data management system is exited to await new data and/or instructions.

As noted, the specific illustrative examples discussed above are but illustrative examples of implementations of embodiments of the method or process for determining if a new data acquisition process is working correctly for users of a data management system. Those of skill in the art will readily recognize that other implementations and embodiments are possible. Therefore, the discussion above should not be construed as a limitation on the claims provided below.

A method includes training an analysis model with a machine learning process obtaining first financial data from an account of a user of a data management system via a first process for acquiring data and obtaining second financial data from the account via a second process for acquiring data. The method includes generating a data set from the first and second financial data, generating, based on analyzing the data set with the trained analysis model, analysis data indicating whether the second process is correctly obtaining details of the account, and migrating the user to the second process if the analysis data indicates that the second process is functioning properly.

The disclosed method and system for determining if a new data acquisition process is working correctly for users of a data management system greatly enhances the efficiency of the migration process to a new data acquisition process. Embodiments of the present disclosure enable the automatic identification of whether the new data acquisition process is working for all financial accounts of users of the data management system. Consequently, using the disclosed method and system for determining if a new data acquisition process is working correctly for users of a data management system results in more efficient use of human and non-human resources, fewer processor cycles being utilized, reduced memory utilization, and less communications bandwidth being utilized to relay data to, and from, backend systems and client systems, and various investigative systems and parties.

As a result, computing systems are transformed into faster, more efficient, and more effective computing systems by implementing the method and system for determining if a new data acquisition process is working correctly for users of a data management system.

The disclosed embodiments provide a method and system for determining if a new data acquisition process is working correctly for users of a data management system more efficiently is provided. Therefore, the disclosed embodiments provide a technical solution to the long-standing technical problem of data service applications that are not easily scalable.

Using the disclosed embodiments result is a highly adaptable and robust method and system for determining if a new data acquisition process is working correctly for users of a data management system. This, in turn, results in: less human and processor resources being dedicated to manually investigating the accounts of users. Accordingly, less time required is for analysis by humans, fewer processing resources are used, and fewer memory storage assets are used.

The disclosed method and system for determining if a new data acquisition process is working correctly for users of a data management system does not encompass, embody, or preclude other forms of innovation in the area of data management systems. In addition, the disclosed method and system for determining if a new data acquisition process is working correctly for users of a data management system is not related to any fundamental economic practice, fundamental data processing practice, mental steps, or pen and paper-based solutions, and is, in fact, directed to providing solutions to new and existing problems associated with data management systems. Consequently, the disclosed method and system for determining if a new data acquisition process is working correctly for users of a data management system, does not encompass, and is not merely, an abstract idea or concept.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGS., or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method performed by a data management system, comprising:
   analyzing a plurality of data sets with an analysis model comprising a first submodel and a second submodel that use different types of machine learning processes, each data set including data downloaded by the data management system from an institution computing environment via a network from an account of one or more users of the data management system via a first data acquisition process and a new data acquisition process that is under test, wherein data downloaded via the new data acquisition process is the same as data downloaded via the first data acquisition process if the new data acquisition process correctly obtains details of the corresponding account, wherein data downloaded via the first data acquisition process has different structures than data downloaded via the new data acquisition process due to differences in the first data acquisition process and the new data acquisition process, wherein account features and transaction features are extracted from the data downloaded and is included in the plurality of data sets; wherein the first submodel of the analysis model is trained to determine whether the account features in the data having different data structures contain the same data, and the second submodel of the analysis model is trained to determine whether the transaction features in the data having different data structures contain the same data;
   determining, with the analysis model for each data set, whether the new data acquisition process correctly obtains details for the corresponding account based on data downloaded via the new data acquisition process containing the same data as data downloaded via the first data acquisition process;
   generating groups of data sets by performing, with a clustering model, a clustering algorithm on the data sets for which the new data acquisition process is not correctly obtaining details for the corresponding account; and
   troubleshooting the new data acquisition process by selecting one or more data sets from each group and investigating the new data acquisition process for the one or more data sets selected from each group.

2. The method of claim 1, wherein the clustering model includes a K means clustering model.

3. The method of claim 1, wherein the clustering model includes a transaction clustering model, wherein each data set includes features of a financial transaction associated with the financial account associated with the data set.

4. The method of claim 1, wherein the clustering model includes an account clustering model, wherein each data set includes features of the account associated with the data set.

5. The method of claim 1, wherein the data from the account of the one or more users is obtained from third-party financial institutions.

6. A computing method performed by a data management system, comprising:
   generating training set data including a plurality of data sets, each data set including data downloaded, by the data management system from an institution computing environment via a network, from an account of one or more users of the data management system via a first data acquisition process and a new data acquisition process that is under test, wherein data downloaded via the new data acquisition process is the same as data downloaded via the first data acquisition process if the new data acquisition process correctly obtains details of the corresponding account, wherein data downloaded via the first data acquisition process has different structures than data downloaded via the new data acquisition process due to differences in the first data acquisition process and the new data acquisition process, each training set data including account features and transaction features extracted from the data downloaded;
   labeling each data set based on whether the new data acquisition process downloaded the same data as the first data acquisition process for the account associated with the data set;
   training an analysis model comprising a first submodel and a second submodel that use different types of machine learning processes, wherein the first submodel is trained to classify account features in each data set in accordance with the labeling, and the second submodel is trained to classify transaction features in each data set in accordance with the labeling; and
   passing additional data sets to the trained analysis model; and
   determining, with the trained analysis model, whether the new data acquisition process downloaded the same data as the first data acquisition process in relation to each additional data set.

7. The method of claim 6, wherein the first data acquisition process includes downloading the data by logging into accounts of the users with a third-party financial institution and performing a screen scraping process on web pages associated with the third-party financial institution.

8. The method of claim 7, wherein the new data acquisition process includes interfacing with an application programming interface (API) hosted by the third-party financial institution and receiving data via the API.

* * * * *